US009314740B2

(12) United States Patent
Moghtaderi et al.

(10) Patent No.: US 9,314,740 B2
(45) Date of Patent: Apr. 19, 2016

(54) CHEMICAL LOOPING REMOVAL OF VENTILATION AIR METHANE

(71) Applicant: NEWCASTLE INNOVATION LIMITED, Callaghan (AU)

(72) Inventors: Behdad Moghtaderi, Callaghan (AU); Elham Doroodchi, Callaghan (AU)

(73) Assignee: NEWCASTLE INNOVATION LIMITED, Callaghan, NSW (AU)

( * ) Notice: Subject to any disclaimer, the term of this patent is extended or adjusted under 35 U.S.C. 154(b) by 36 days.

(21) Appl. No.: 14/348,500

(22) PCT Filed: Sep. 28, 2012

(86) PCT No.: PCT/AU2012/001173
§ 371 (c)(1),
(2) Date: Mar. 28, 2014

(87) PCT Pub. No.: WO2013/044308
PCT Pub. Date: Apr. 4, 2013

(65) Prior Publication Data
US 2014/0227157 A1   Aug. 14, 2014

(30) Foreign Application Priority Data

Sep. 30, 2011   (AU) .............................. 2011904045

(51) Int. Cl.
*A61L 9/00*    (2006.01)
*A61L 9/015*   (2006.01)
(Continued)

(52) U.S. Cl.
CPC ............ *B01D 53/8668* (2013.01); *B01D 53/72* (2013.01); *C01B 3/10* (2013.01);
(Continued)

(58) Field of Classification Search
CPC .......... A61L 9/00; A61L 9/015; B01D 53/72; B01D 53/8668
See application file for complete search history.

(56) References Cited

U.S. PATENT DOCUMENTS

2011/0059410 A1   3/2011   Glynn
2011/0067401 A1   3/2011   Kajita
(Continued)

FOREIGN PATENT DOCUMENTS

| CN | 102618349 A | * | 8/2012 | .............. C10L 10/00 |
|----|-------------|---|--------|--------------------------|
| CN | 103552983 A | * | 2/2014 | ................ C01B 3/48 |
| EP | 1580162     |   | 9/2005 | |
| WO | 2010/085835 A1 | | 8/2010 | |

OTHER PUBLICATIONS

International Search Report and Written Opinion for PCT/AU2012/001173, mailed on Jan. 17, 2013.
(Continued)

*Primary Examiner* — Timothy Vanoy
(74) *Attorney, Agent, or Firm* — Ladas & Parry, LLP (57) ABSTRACT

Methane is removed from ventilation air by cycling metal or metal oxide particles in a chemical looping process in one or more reactors where the metal particles are alternately reduced and oxidized, and passing ventilation air through one or more of reactors to convert the air plus methane into reduced air, water and carbon dioxide. In one variation, a hydrogen generator and a regenerator are used to alternatively reduce and oxidize the particles such that ventilation air methane introduced into a combustor provided with hydrogen from the hydrogen generator can be processed in the regenerator to produce air, water and carbon dioxide. Other variations involve using three reactors in the chemical looping process, or an array of parallel inclined plates forming lamellas between upper and lower reactors to keep lighter particles in the upper oxidizer reactor and heavier particles in the lower reducer reactor.

13 Claims, 10 Drawing Sheets

(51) Int. Cl.
  B01D 53/72    (2006.01)
  B01D 53/86    (2006.01)
  C01B 31/20    (2006.01)
  C01B 3/10     (2006.01)

(52) U.S. Cl.
  CPC ............ *C01B 31/20* (2013.01); *B01D 2251/20* (2013.01); *B01D 2255/20738* (2013.01); *B01D 2255/20761* (2013.01); *B01D 2257/7025* (2013.01); *Y02C 20/20* (2013.01); *Y02E 60/36* (2013.01); *Y02P 20/142* (2015.11); *Y02P 20/156* (2015.11)

(56)  References Cited

U.S. PATENT DOCUMENTS

| 2011/0081277 | A1  | 4/2011  | Balon et al. | |
|---|---|---|---|---|
| 2013/0255550 | A1* | 10/2013 | Ajhar et al. | 110/345 |
| 2014/0275297 | A1* | 9/2014  | Velazquez-Vargas et al. | 518/702 |

OTHER PUBLICATIONS

Fang, H. et al., "Advancements in Development of Chemical-Looping Combustion: A Review", International Journal of Chemical Engineering, 2009, Hindawi Publishing Corporation, vol. 2009, pp. 1-16.

Somers, J.M. et al., "Thermal Oxidation of Coal Mine Ventilation Air Methane", $12^{th}$ U.S./North American Mine Ventilation Symposium 2008, Wallace (ed), pp. 301-306.

Ryu, H.-J., et al., "Chemical Looping Hydrogen Generation System: Performance Estimation and Process Selection", Korean Journal of Chemical Engineering, 2007, Korean Institute of Chemical Engineering, vol. 24, No. 3, pp. 527-531.

Extended European Search Report dated May 26, 2015 for European Patent Application No. 12836598.8.

Gosiewski et al., "Homogenous Vs. Catalytic Combustion of Lean Methane-Air Mixtures in Reverse-Flow Reactors", Chemical Engineering Science 63, (2008), pp. 5010-5019.

Sazonov et al., "Catalytic Combustion of Lean Methane-Air Mixtures", Catalytic Today 47, (1999), pp. 149-153.

* cited by examiner

Figure 1: Schematic representation of the chemical looping concept.

CHEMICAL LOOPING REMOVAL OF VENTILATION AIR METHANE

CROSS-REFERENCE TO RELATED APPLICATIONS

This application is the U.S. National Stage of International Patent Application No. PCT/AU2012/001173 filed on Sep. 28, 2012, which claims priority to Australian Patent Application No. 2011904045, filed on Sep. 30, 2011, the disclosures of which are hereby incorporated by reference in their entireties.

BACKGROUND OF THE INVENTION

This invention relates to the chemical looping removal of ventilation air methane and has been devised particularly, though not solely, for removing methane from ventilation air in coal mines.

Release of fugitive methane ($CH_4$) emissions from ventilation air in coalmines is a major source of greenhouse gas emissions (the greenhouse impact of methane is 21 times greater than that of $CO_2$). Approximately 64% of methane emissions in coalmine operations are the result of ventilation air methane (VAM). There are two alternative strategies for mitigation of VAM in mining operations, namely: (i) utilisation of VAM as an energy source, (ii) destruction of VAM through an oxidation process. To date, the implementation of the former strategy has found to be difficult primarily because:

the volume of the gas mixture is large (can be as high as 600 $m^3/s$);
the methane concentration in the mixture is dilute (0.1-1% V/V), and;
the concentration of methane and the flow rate of the gas mixture are variable.

The latter strategy (i.e. VAM destruction) has been found more attractive and easier to adopt. Although technologies based VAM destruction are technically feasible to mitigate VAM when the methane concentration in air exceeds their minimum requirement and economic performance is not an issue, such systems often need additional fuel for continuous operation. Current estimates suggest that the additional fuel intake may be at least 0.9% to maintain methane concentration at suitable levels for prolonged operations. Examples of VAM mitigation systems based on the destruction strategy are:

TFRR (VOCSIDIZER, MEGTEC)
CFRR (CANMET)
CMR, catalytic monolith reactor (CSIRO)
CLBGT, catalytic lean-burn gas turbine (CSIRO, Ingersol-Rand)
RLBGT, recuperative lean-burn gas turbine (EDL)
VAM-RAB, ventilated air methane regenerative after burner (Corkys Pty Ltd)

The present invention therefore provides an alternative to these earlier forms of VAM destruction by using the concept of chemical looping for mitigation of VAM.

SUMMARY OF THE INVENTION

Accordingly, in a broad aspect the present invention provides a method of removing methane from ventilation air by cycling metal or metal oxide particles in a chemical looping process in one or more reactors where the metal particles are alternately reduced and oxidised, and passing ventilation air through one or more of said reactors to convert the air plus methane into reduced air plus water plus carbon dioxide.

In one more specific form the invention provides a method of removing methane from ventilation air including the steps of;
i. generating hydrogen in a hydrogen generator fed with steam and reduced metal oxide to produce hydrogen and oxidised metal oxide,
ii. combusting the ventilation air in a combustor fed with said hydrogen in the presence of metal oxides to produce a gaseous mixture of air plus water plus carbon dioxide, and
iii. feeding said gaseous mixture to a regenerator together with the oxidised metal oxide from step i to produce reduced air plus water plus carbon dioxide, and highly oxidised metal oxide which is fed to the combustor for use in step ii.

In various forms of the invention a gasifier may be embedded in either the combustor or the hydrogen generator.

Preferably, the metal oxide is in the form of particles of the iron metal oxide Wuestite, with the oxidised metal oxide being Hematite and the highly oxidised metal oxide being Magnetite.

In a still further aspect the invention provides a method of removing methane from ventilation air including the steps of:
i. generating hydrogen in a hydrogen generator fed with steam and exchanging metal oxides with a regenerator in a chemical looping process, and
ii. combusting the ventilation air in a combustor fed with said hydrogen to produce a gaseous mixture of reduced air plus water plus carbon dioxide which is fed in turn to the regenerator for the reduction of the metal oxides and the emission of air plus water plus carbon dioxide.

In one form of the invention, a gasifier is embedded in the hydrogen generator.

Preferably the metal oxides are in the form of particles of iron metal oxide.

In a further aspect of the invention, the method uses upper and lower reactors connected by an array of parallel inclined plates forming lamellas, the upper reactor forming an oxidiser section and the lower reactor forming a reducer section, wherein the lamellas provide an internal circulation allowing lighter particles to travel to the upper oxidiser section, while keeping heavier particles in the lower reducer section.

In one embodiment, the lighter particles comprise $Fe_3O_4$ and the heavier particles comprise $Fe_2O_3$.

In an alternative embodiment lighter particles comprise CuO and the heavier particles comprise Cu.

In one form of the invention a gasifier is embedded in the upper reactor.

To increase the throughput a plurality of upper and lower reactors each connected by a lamella array are operated in parallel.

BRIEF DESCRIPTION OF THE DRAWINGS

Notwithstanding any other forms which may fall within its scope, one preferred form of the invention will now be described by way of example only with reference to the accompanying drawings in which.

PREFERRED EMBODIMENTS OF THE INVENTION

The present invention uses the principal of chemical looping to remove methane ($CH_4$) from ventilation air. The general principle of the chemical looping process will now be described with reference to FIG. 1.

Figure 1:
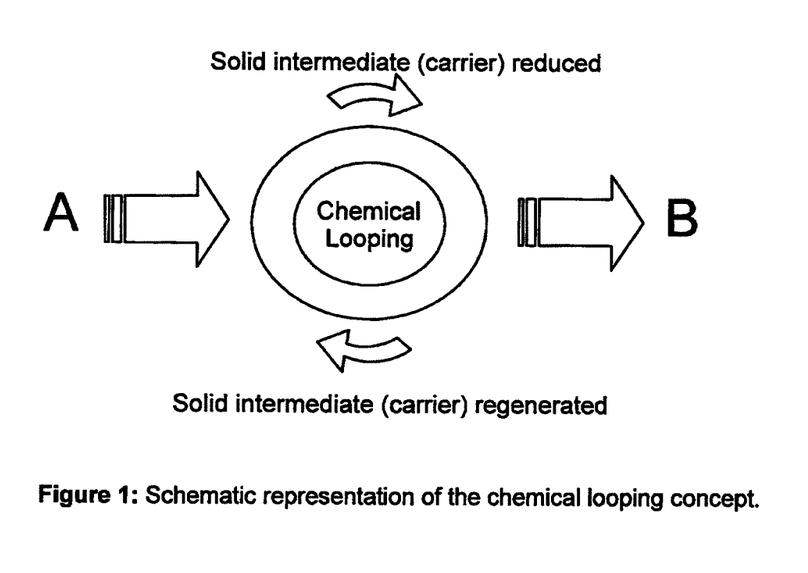
FIG. 1 is a schematic representation of the chemical looping concept.

As shown schematically in FIG. 1, in the chemical looping process a given chemical reaction (e.g. A+B→C+D) is divided into multiple sub-reactions using solid intermediates (SI) such as metals (Me), metal oxides (MeO) and carbon dioxide scavengers (e.g. CaO). These intermediates are reduced and regenerated in a cyclic fashion through the progress of the sub-reactions. The process is typically carried out by circulation of SI particles via a system of two interconnected reactors (typically fluidised beds) where sub-reactions are executed.

$A + SI_1 \rightarrow C + SI_2$ $B + SI_2 \rightarrow D + SI_1$

Overall: $A + B \rightarrow C + D$

Chemical looping schemes can be designed in such a manner that the energy and exergy losses of the overall process are minimised while allowing the separation of the undesired products (e.g. $CO_2$) generated from the reactions to be accomplished with ease, yielding an overall efficient and economical process. It is this inherent ability for separation of undesired products, such as $CO_2$, which makes the chemical looping process an invaluable tool in low $CO_2$ emission technologies (e.g. clean coal technologies). Furthermore, the ability to incorporate a diverse range of intermediates (e.g. metal oxides, $CO_2$ scavengers, etc) provides the chemical looping concept with an unprecedented versatility, enabling it to be used in a wide range of applications.

The process for chemical looping removal of ventilation air methane (CLRVAM) can be categorised into three main groups, namely:

1. Hydrogen-based CLRVAM as a two-step or three-step processes
2. Non-hydrogen based single reactor CLRVAM process
3. Non-hydrogen based CLRVAM processes using novel "Lamella Embedded Combined" (LEC) reactors.

The hydrogen based CLRVAM processes comprise three main steps, namely:

1. $H_2$ production using the steam reforming of metal oxides
2. Combustion of VAM in the presence of hydrogen
3. Regeneration of metal oxides The idea in the hydrogen-based processes is to always maintain the total fuel content ($H_2+CH_4$) above the flammability limit.

These steps can be executed by employing one of the following two alternative approaches:

1. A three-step chemical loop (3S-CLRVAM)
2. A two-step chemical loop (2S-CLRVAM)

The former leads to a flameless low/medium temperature oxidation process during the combustion of VAM/$H_2$ mixture while the latter results in a high temperature flaming combustion. The 3S-CLRVAM is more complex but has a much lower energy footprint than the 2S-CLRVAM version. These alternative approaches are described below.

3S-CLRVAM

Figure 2:
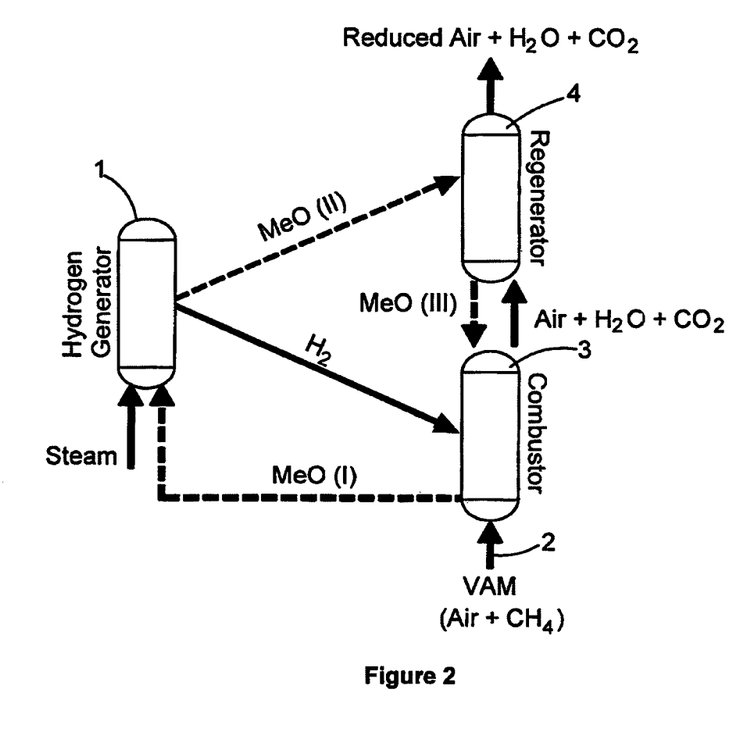
FIG. 2 is a schematic representation of a three step ventilation air methane (VAM) removal process according to the invention.

The CLR-VAM process incorporates a three-step chemical loop to fully integrate the hydrogen production, combustion and regeneration steps (FIG. 2). Because of the need for high purity hydrogen, the CLR-VAM process can work best with metals with multiple oxidation states. Among these iron (Fe) is preferred primarily because:

Fe has three oxides namely Wuestite (FeO), Hematite ($Fe_2O_3$), and Magnetite ($Fe_3O_4$)

Fe based oxides are abundant in nature and are of low cost

Oxides of Fe show relatively good redox properties

Oxides of Fe have good mechanical and thermal stability

Fe based oxides are not toxic and are environmentally benign

The main goal in Step 1 is to produce high purity hydrogen. The working principle of the chemical looping based process employed in this step is based on the cyclic reduction and oxidation of suitable metal oxides oxygen carrier particles, for example FeO (Wuestite) to $Fe_3O_4$ (Magnetite). This is carried out by exchanging the carrier particles between the three interconnected reactors involved in the process (see FIG. 2).

In Step 2, the mixture of $H_2$ transferred from the hydrogen generator 1 and the incoming VAM stream 2 are combusted together in a combustor 3 in the presence of metal oxides. This ensures non-flaming oxidation of the fuel mixture at moderate to low temperatures (e.g. 500-600° C.). Also, hydrogen is used in Step 2 so that the overall fuel to oxygen ratio (i.e. $[H_2+CH_4]/O_2$) is increased. This ensures the complete combustion of the fuel/air mixture in a robust manner; leading to generation of $CO_2$ and $H_2O$. As shown in FIG. 2, Step 2 is carried out in the presence of fully regenerated metal oxide particles which are at their highest oxidation state (i.e. Hematite, $Fe_2O_3$, in the case of iron). Much of the oxygen required for the combustion process (i.e. fuel oxidation) is provided by MeO (III) as they are more reactive than air. However, additional oxygen may be consumed from the ventilation air and as a result slight reduction in $O_2$ concentration of the ventilation air may be observed. During Step 2, MeO (III) is reduced to the lowest oxidation state for the metal employed in the process (MeO (I)), for example $Fe_2O_3$ (Hematite) reduces to FeO (Wuestite) in the case of iron. The reduced metal, MeO (I), is then fed back to the hydrogen generator 1.

Step 2 provides a very effective means of dealing with variations and/or fluctuations in methane concentration. For instance, when methane concentration in VAM is low, addition of $H_2$ shifts the oxidation process towards full completion. Whilst, for situations where methane concentration in VAM increases to levels close to explosion limit, the flows of $H_2$ and MeO (III) can be stopped and steam is redirected to the combustor rather than the hydrogen generator. This not only brings the hydrogen production to an end but also significantly dilutes the concentration of the fuel/air mixture in the combustor, ultimately preventing any potential explosion.

In Step 3, the gaseous mixture exiting from the combustor and particles of MeO (II) (e.g. $Fe_3O_4$ or Magnetite in the case of iron) from the hydrogen generator are fed into the third reactor (regenerator 4). Here, the metal at its intermediate oxidation state is oxidised by incoming air/steam/$CO_2$ mixture from the combustor and reaches its highest oxidation state.

2S-CLRVAM

In Step 1, hydrogen is generated by chemical looping steam reforming although a metal oxide with reversible reduction/oxidation (redox) properties is preferred (e.g. Co, Mn, Cu).

The main goal in Step 1 is to produce high purity hydrogen. The working principle of the chemical looping based process employed in this step is based on the cyclic reduction and oxidation of suitable metal oxides oxygen carrier particles (e.g. Cu/CuO). This is typically carried out by exchanging the carrier particles between two interconnected fluidised bed reactors.

Figure 3:
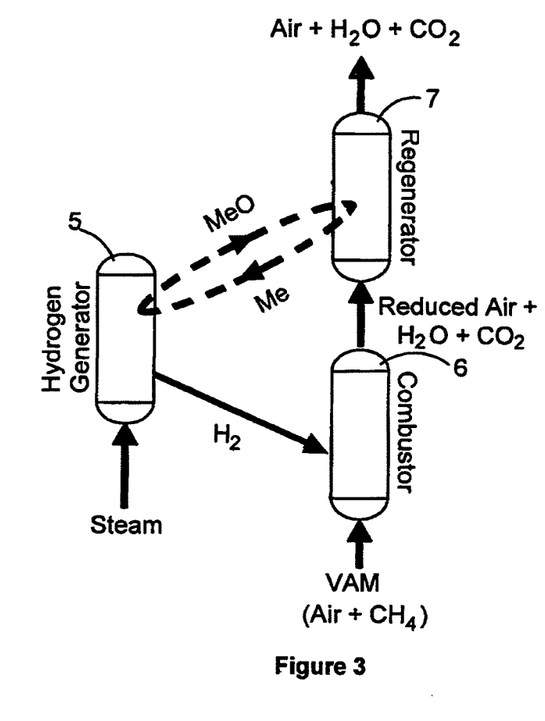
FIG. 3 is a schematic representation of a two step ventilation air methane removal process according to the invention.

In Step 2, $H_2$ is transferred from the hydrogen generator 5 (FIG. 3) to the combustor 6 so that the overall fuel to air ratio (i.e. [$H_2$+$CH_4$]/air) is increased and brought to levels close to the minimum flammability limit. This ensures the complete combustion of the fuel/air mixture in a robust manner; leading to generation of $CO_2$ and $H_2O$ and slight reduction in $O_2$ concentration of the ventilation air (i.e. reduced air). This step provides a very effective means of dealing with variations and/or fluctuations in methane concentration. For instance, when methane concentration in VAM is below the lower flammability limit, addition of $H_2$ shifts the oxidation process towards the generation of a stable flame. Whilst, for situations where methane concentration in VAM increases to levels close to explosion limit, the flow of $H_2$ can be stopped simply by directing steam to the combustor rather than the hydrogen generator. This not only brings the hydrogen production to an end but also significantly dilutes the concentration of the fuel/air mixture in the combustor, ultimately preventing any potential explosion.

In Step 3, the gaseous mixture exiting from the combustor and the MeO from the hydrogen generator are fed into the third reactor (regenerator 7). Here, the reduced air is enriched by decoupling the oxygen from MeO simply by controlling the partial pressure of oxygen. This ensures that the mixture exiting the regenerator only contains normal air, steam and carbon dioxide. The steam in the outlet can be separated out by condensation and the resulting water can be reused as make-up water in the steam generation process (not shown in FIG. 3).

These hydrogen-based CLRVAM processes can be developed into three different systems with an embedded gasifier interfaced into these processes for reduction of metal oxides and production of process heat/power.

Figure 4:
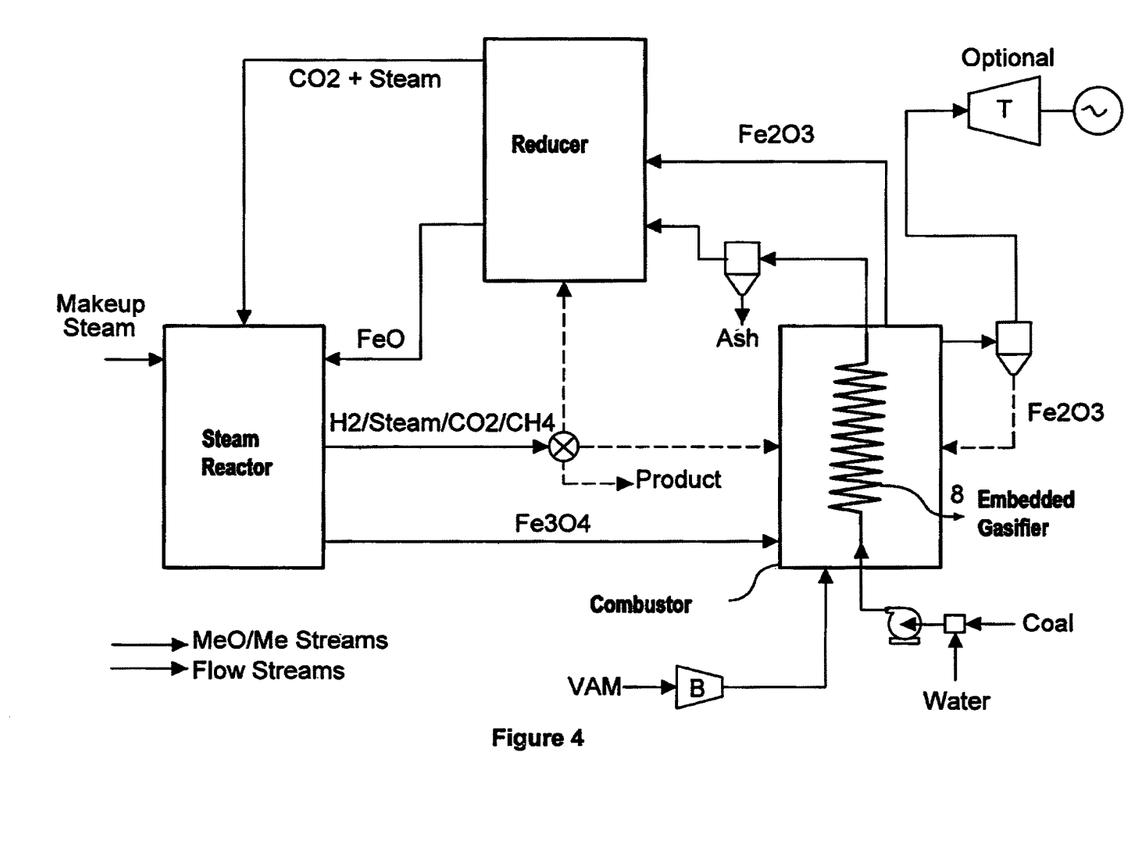
FIG. 4 is a schematic representation of the three step VAM shown in FIG. 2, with an embedded gasifier.
Figure 5:
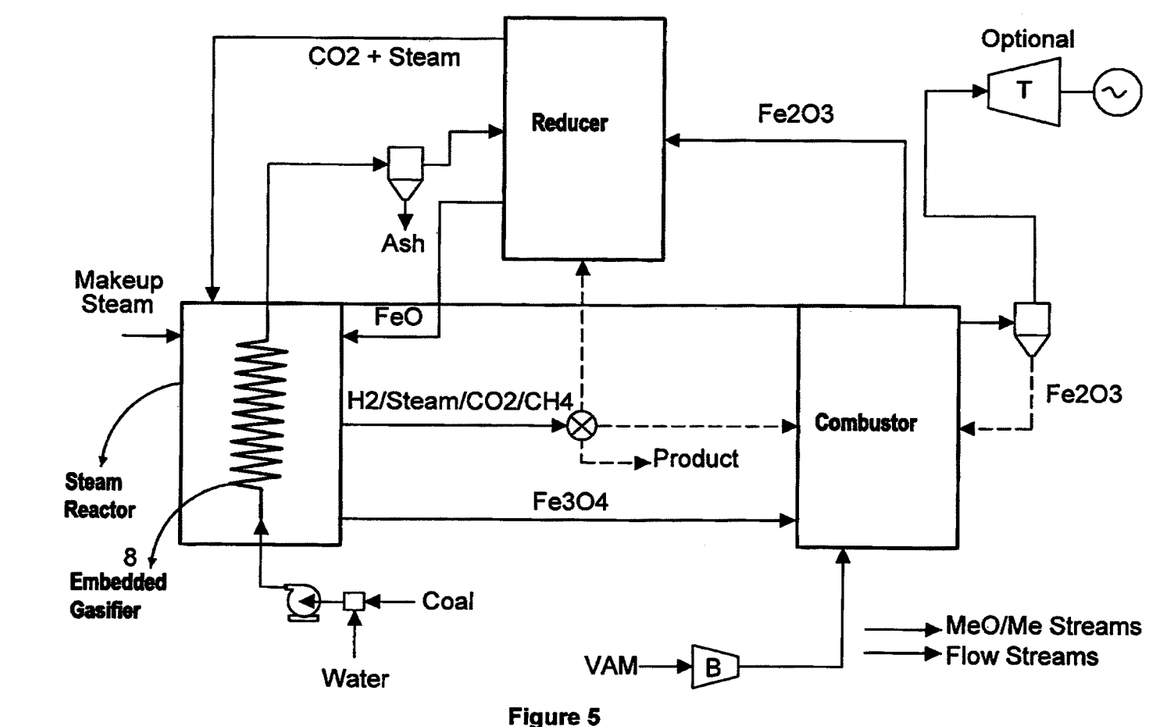
FIG. 5 is an alternative version of the three step VAM shown in FIG. 4.
Figure 6:
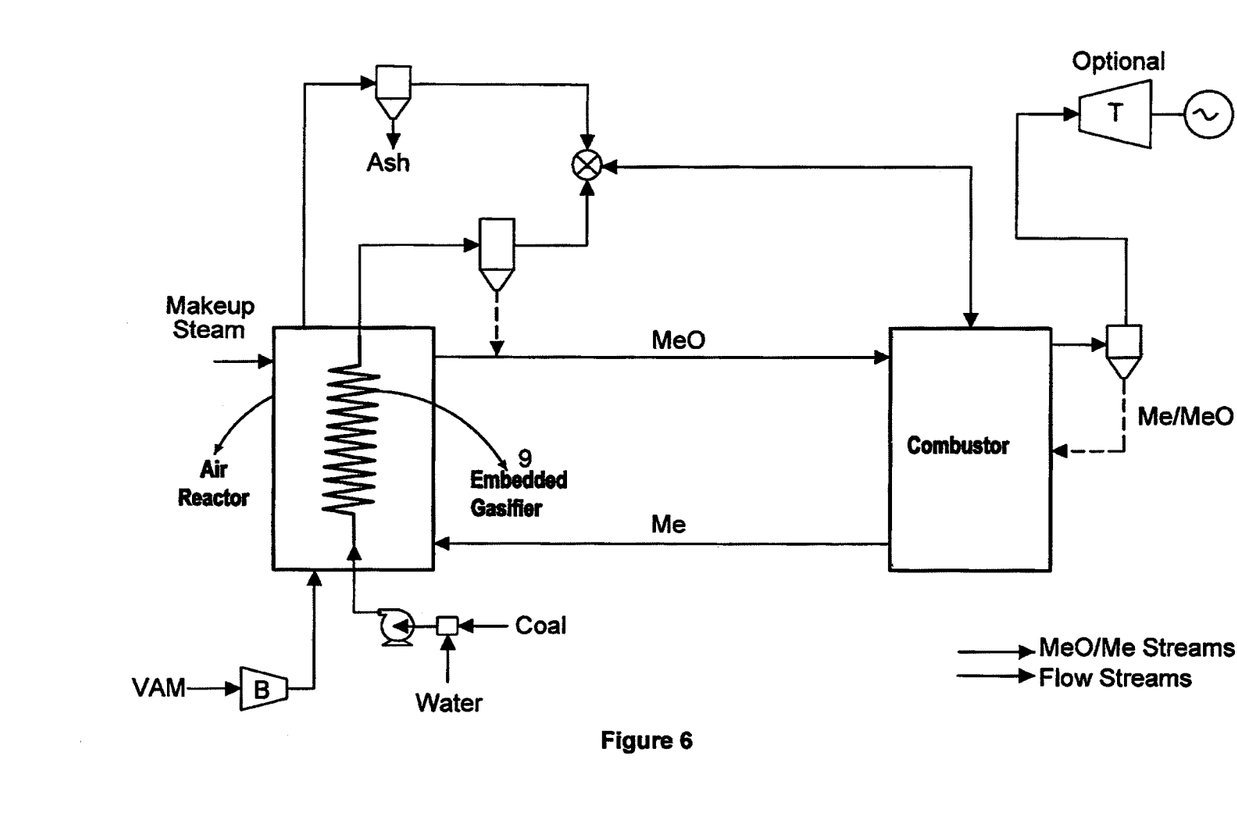
FIG. 6 is a schematic representation of the two step VAM shown in FIG. 3, with an embedded gasifier.

FIG. 4 and FIG. 5 show two different three reactor versions with the embedded gasifier shown at 8, while FIG. 6 shows a two reactor version with the embedded gasifier shown at 9.

Non-Hydrogen Based CLRVAM

Figure 7:
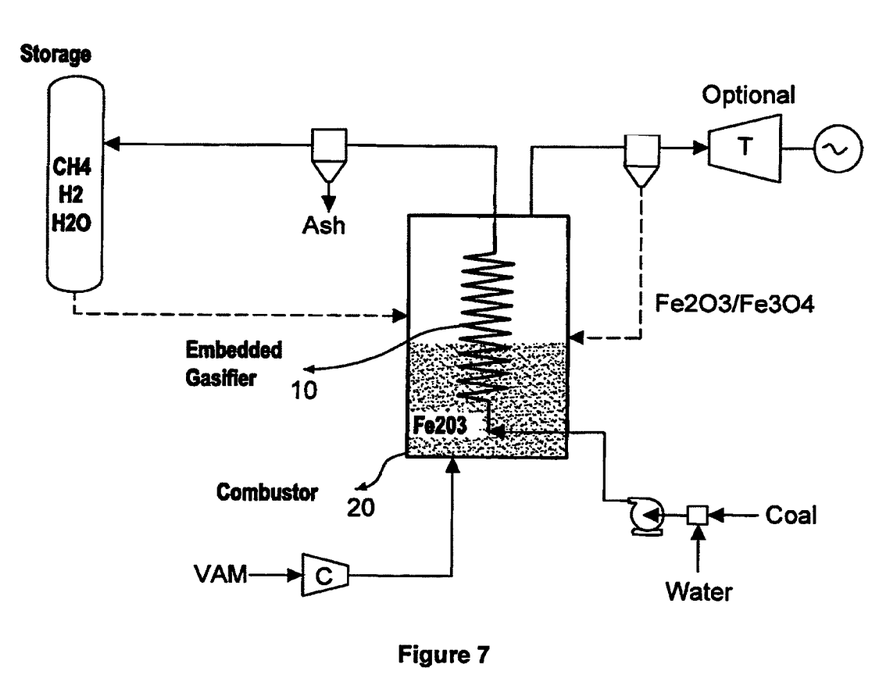
FIG. 7 is a schematic representation of the VAM in a single reactor process with an embedded gasifier.

It is possible to provide non-hydrogen based CLRVAM in a single reactor process as shown in FIG. 7. This process operates based on the simultaneous oxidation and reduction of Fe2O3/Fe3O4 in a single reactor 20. The reactor can be either fixed- or fluidised-bed although fluidised-bed type reactors provide a more robust operation. The process can be interfaced with an embedded gasifier 10 and other unit operations for heat/power generation, and there is no hydrogen involved.

CLRVAM processes can also be provided using "Lamella Embedded Combined" (LEC) Reactors as shown in FIGS. 8 to 11. In this approach VAM is neutralised simply by redox (reduction/oxidation) reactions of metal oxides such as $Fe_2O_3$/$Fe_3O_4$ (or CuO/Cu) and there is no hydrogen involved.

The working principle of LEC is simple and involves the cyclic reduction and regeneration of metallic oxide particles as a means of oxidising methane in ventilation air. However, unlike the conventional chemical looping based processes the cyclic reactions in VAMCO (Ventilation Air Methane Cyclic Oxidation) are conducted in a single fluidised bed reactor rather than two (see FIG. 8). This is achieved by using the inclined lamella embedded section shown in FIG. 8 which internally separates reacting particles based on their density difference (gravity separation). Heavier particles which are typically at their full oxidation state (MeO) are forced to remain at the bottom of the reactor by the lamellas while lighter particles (typically at a lower oxidation state "Me") are transported through the lamella section up to the top of the reactor. The reaction taking place in the bottom section is predominately the reduction of MeO by methane content of the ventilation air while the reaction at the top section is regeneration (i.e. oxidation) of reduced metal (Me) to a higher oxidation state.

Metal oxide systems of interest for VAM abatement include Fe2O3/Fe3O4 and CuO/Cu. The key technical features of VAMCO are:
1. Very simple hardware (single reactor fitted with lamellas; no moving part)
2. Operation at atmospheric pressure
3. Inherent safety
   Non-flaming reactions
   Moderate reaction temperatures (typically 550-750° C.)
   Endothermic reaction between CH4 and MeO in the reduction section (no risk of ignition)
   Lamella section acts as a flame arrestor preventing any reaction front formed in the regeneration section to travel towards the VAM inlet (i.e. capture duct)\

Figures 8, 9:
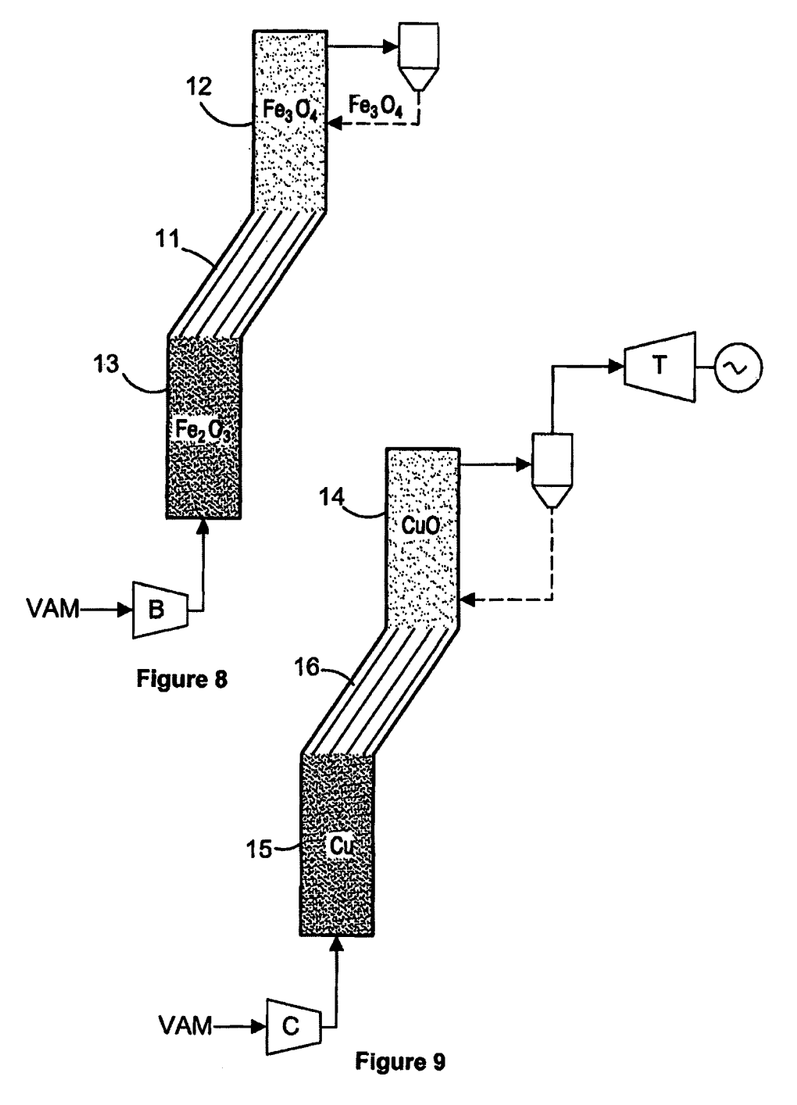
FIG. 8 is a schematic representation of a lamella embedded combined (LEC) reactor.
FIG. 9 an alternative version of the LEC shown in FIG. 8.

As shown in FIG. 8, the reactor is fitted with a series of inclined plates 11 (so-called lamellas) which divide the reactor into two sections, an oxidiser section 12 and a reducer section 13. The lamellas 11 provide an internal circulation allowing lighter particles to travel to the top oxidiser section 12 while preventing heavier particles from moving up, as such keeping them at the bottom reducer section 13. The lamellas allow reacting particles to be separated based on their density. As such, in the case of $Fe_2O_3$/$Fe_3O_4$, the heavier $Fe_2O_3$ particles will predominately exist at the bottom section 13 while lighter $Fe_3O_4$ particles exist at the top section 12. This effectively converts the bottom section into a "reducer" and the top section into an "oxidiser".

A further version of the CLRVAM process using lamella embedded reactors is shown in FIG. 9 using Cu and CuO between a reducer 14 in the upper section and a regenerator 15 in the lower section, connected by the inclined plate lamellas 16.

Heat Demand in LEC-Based CLRVAM Systems

Figure 10:
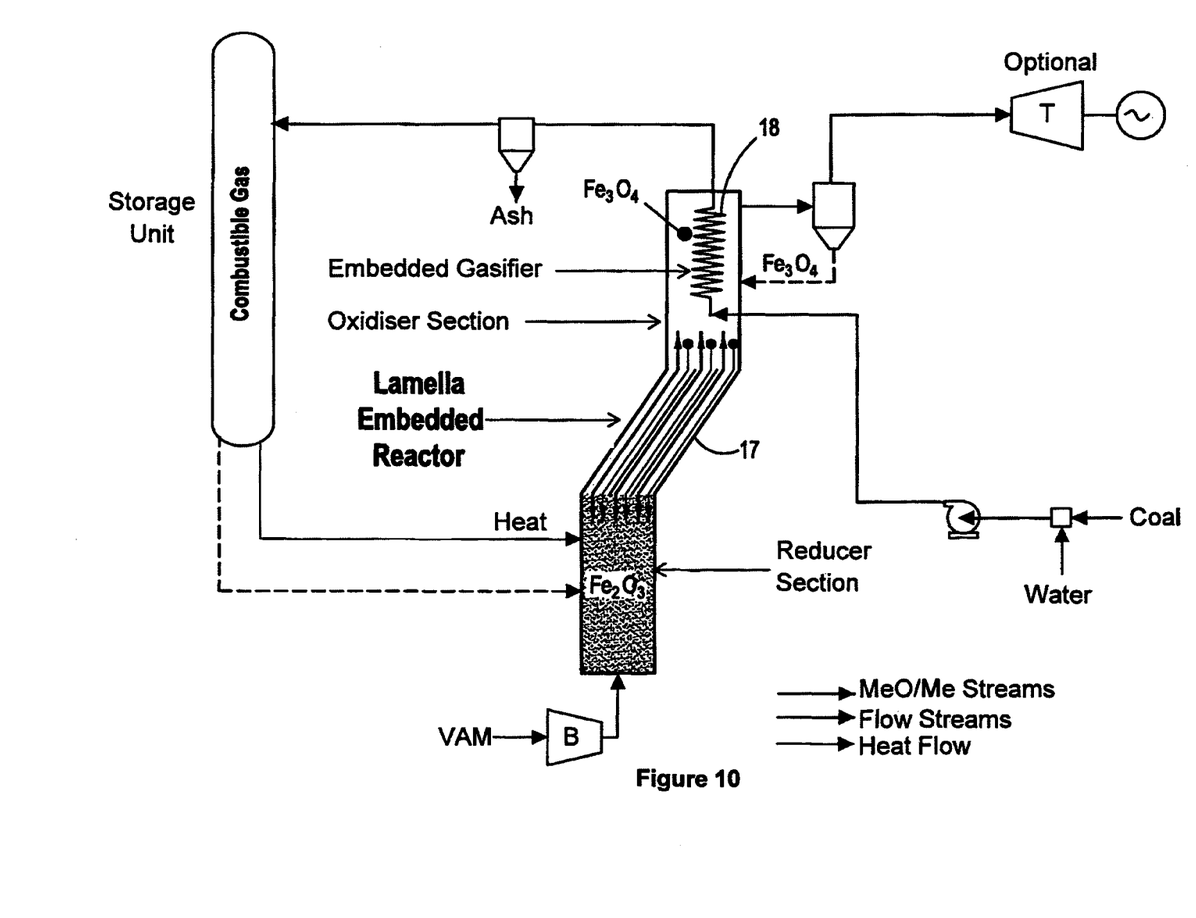
FIG. 10 is a schematic representation of a complete LEC based CLRVAM module.

Based on preliminary thermodynamic analysis the LEC-based CLRVAM systems are extremely energy efficient and can be self sustaining from methane concentrations of about 0.1 vol % which is much lower than the corresponding figures for conventional VAM mitigation systems. This is partly due to the fact that heat is internally circulated from the oxidiser (where the reactions are always exothermic) to the reducer by hot metal oxide particles as shown in FIG. 10. It is also partly due to the fact that the LEC reactor 17 contains metal oxides which have much higher thermal mass than even brick.

The LEC reactor can be interfaced with an embedded gasifier 18 to:
(A) either meet the energy demands when $CH_4$ concentration is lower than self-sustaining levels; or
(B) to make partial use of the excess heat (see FIG. 10).

Integration of LEC-Based CLRVAM Modules

Figure 11:
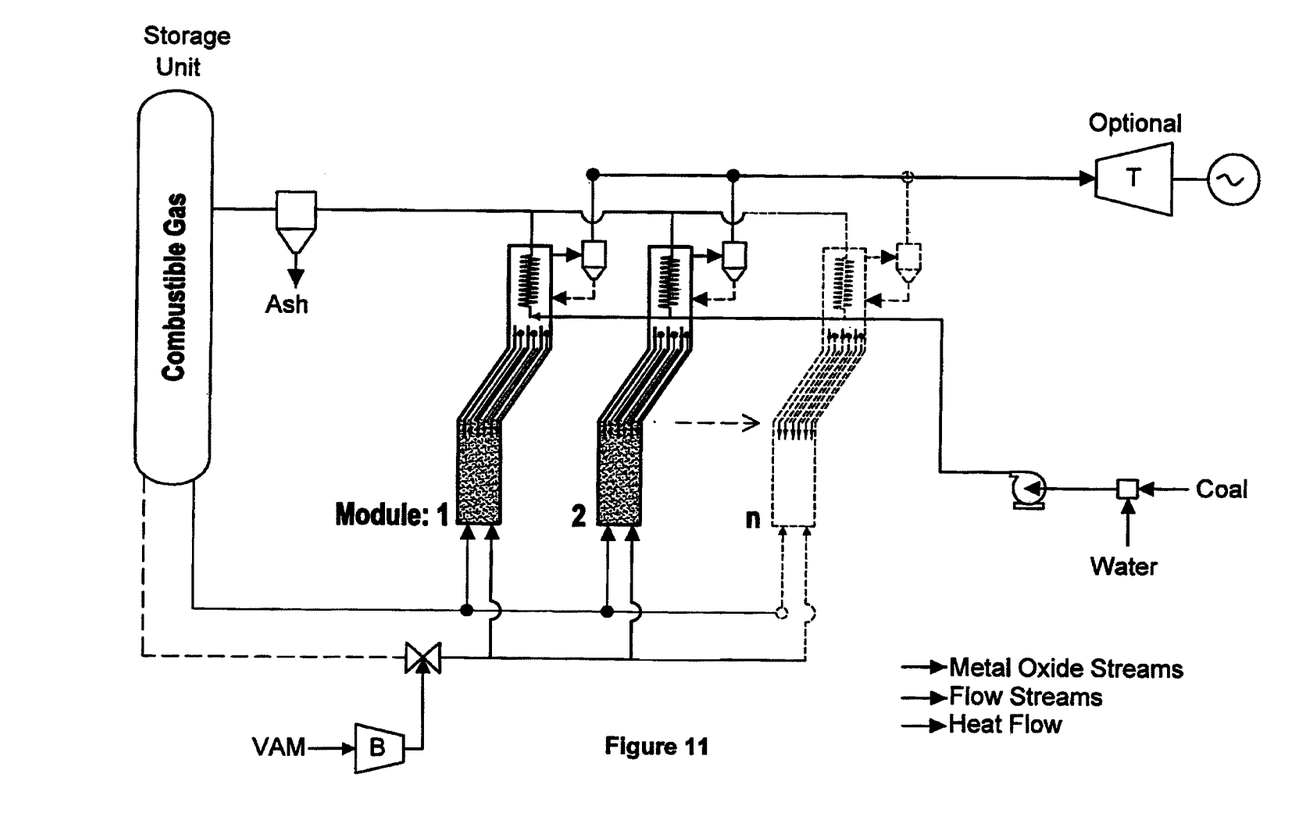
FIG. 11 is a similar view to FIG. 10 showing a plurality of LEC modules in parallel.

LEC modules can be scaled up to meet any VAM flow rate or methane concentration either through:
1. Physical enlargement of the LEC reactor and an increase in the solid inventory or alternatively by
2. Parallelisation of a number of LEC modules 19 as shown in FIG. 11.

Preliminary investigations suggest that the latter approach can handle fluctuations in methane concentration more effectively/robustly and is also more cost effective.

Safety: LEC-Based CLRVAM Systems

A LEC reactor is inherently very safe for a number of reasons:
1. The temperatures in the oxidiser and reducer sections are not a function of reaction kinetics or gas flow rate, but only of the thermo-physical properties of the gas and solid materials.
2. Therefore the reactor can be operated at temperatures lower than flaming combustion simply by adjusting the solid inventory.
3. The embedded lamellas act as a flame arrester.

Metal oxide solid particles have very high thermal mass and can remove heat rapidly from any accidental flame front; leading to flame extinction.

The invention claimed is:

1. A method of removing methane from ventilation air by cycling metal or metal oxide particles in a chemical looping process in one or more reactors where the metal particles are alternately reduced and oxidised, and passing ventilation air through one or more of said reactors to convert the air plus methane into reduced air plus water plus carbon dioxide.

2. A method of removing methane from ventilation air as claimed in claim 1 including the steps of;
   i. generating hydrogen in a hydrogen generator fed with steam and reduced metal oxide to produce hydrogen and oxidised metal oxide,
   ii. combusting the ventilation air in a combustor fed with said hydrogen in the presence of highly oxidised metal oxides to produce a gaseous mixture of air plus water plus carbon dioxide, and
   iii. feeding said gaseous mixture to a regenerator together with the oxidised metal oxide from step i to produce reduced air plus water plus carbon dioxide, and highly oxidised metal oxide which is fed to the combustor for use in step ii.

3. A method of removing methane from ventilation air as claimed in claim 2 wherein a gasifier is embedded in the combustor.

4. A method of removing methane from ventilation air as claimed in claim 2 wherein a gasifier is embedded in the hydrogen generator.

5. A method of removing methane from ventilation air as claimed in claim 2 wherein the metal oxide is in the form of particles of the iron metal oxide Wuestite, with the oxidised metal oxide being Magnetite and the highly oxidised metal oxide being Hematite.

6. A method of removing methane from ventilation air as claimed in claim 1 including the steps of:
   i. generating hydrogen in a hydrogen generator fed with steam and exchanging metal oxides with a regenerator in a chemical looping process, and
   ii. combusting the ventilation air in a combustor fed with said hydrogen to produce a gaseous mixture of reduced air plus water plus carbon dioxide which is fed in turn to the regenerator for the reduction of the metal oxides and the emission of air plus water plus carbon dioxide.

7. A method of removing methane from ventilation air as claimed in claim 6 wherein a gasifier is embedded in the hydrogen generator.

8. A method of removing methane from ventilation air as claimed in claim 6 wherein the metal oxides are in the form of particles of iron metal oxide.

9. A method of removing methane from ventilation air as claimed in claim 1 wherein there are upper and lower reactors connected by an array of parallel inclined plates forming lamellas, the upper reactor forming an oxidiser section and the lower reactor forming a reducer section, wherein the lamellas provide an internal circulation allowing lighter particles to travel to the upper oxidiser section, while keeping heavier particles in the lower reducer section.

10. A method of removing methane from ventilation air as claimed in claim 9 wherein the lighter particles comprise $Fe_3O_4$ and the heavier particles comprise $Fe_2O_3$.

11. A method of removing methane from ventilation air as claimed in claim 9 wherein the lighter particles comprise CuO and the heavier particles comprise Cu.

12. A method of removing methane from ventilation air as claimed in claim 9 wherein a gasifier is embedded in the upper reactor.

13. A method of removing methane from ventilation air as claimed in claim 9 wherein a plurality of upper and lower reactors each connected by a lamella array are operated in parallel to increase the throughput of the method.

* * * * *